US010146877B1

(12) United States Patent
Zolnieryk et al.

(10) Patent No.: US 10,146,877 B1
(45) Date of Patent: Dec. 4, 2018

(54) AREA OF INTEREST SUBSCRIPTION

(71) Applicant: Amazon Technologies, Inc., Seattle, WA (US)

(72) Inventors: Martin Paul Zolnieryk, Seattle, WA (US); Adam Julio Villalobos, Kirkland, WA (US); Alexander Neil Stajos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 585 days.

(21) Appl. No.: 14/827,882

(22) Filed: Aug. 17, 2015

(51) Int. Cl.
*G06F 17/30* (2006.01)
*G06F 3/0487* (2013.01)

(52) U.S. Cl.
CPC ...... *G06F 17/30867* (2013.01); *G06F 3/0487* (2013.01)

(58) Field of Classification Search
CPC .................. G06F 17/30867; G06F 3/0487
See application file for complete search history.

(56) References Cited

U.S. PATENT DOCUMENTS

| 6,535,232 | B1* | 3/2003 | Tsuda ..................... G06T 13/00 345/427 |
| 8,000,328 | B1* | 8/2011 | Kandekar ............... H04L 45/54 370/392 |
| 8,135,018 | B1* | 3/2012 | Kandekar ............. A63F 13/352 370/395.31 |
| 2002/0103776 | A1* | 8/2002 | Bella .................... G06K 9/6217 706/49 |
| 2007/0103461 | A1* | 5/2007 | Suzuno ................... G06T 17/05 345/419 |
| 2009/0066700 | A1* | 3/2009 | Harding ................. G06T 13/40 345/473 |
| 2014/0152698 | A1* | 6/2014 | Kim ...................... G06L 19/006 345/633 |
| 2014/0225930 | A1* | 8/2014 | Durmek ................. G09G 5/363 345/659 |
| 2015/0078621 | A1* | 3/2015 | Choi ...................... G09G 5/14 382/103 |
| 2016/0042558 | A1* | 2/2016 | Park ..................... G06T 15/506 345/426 |

* cited by examiner

*Primary Examiner* — Jared M Bibbee
(74) *Attorney, Agent, or Firm* — Baker & Hostetler LLP

(57) ABSTRACT

Techniques for area of interest subscription are described herein. In some examples, a requestor, such as a client or other component, may be focused on a particular area of interest within a virtual space. A requestor may, for example, provide information indicating its area of interest within the virtual space. This information may then be used to determine one or more sub-spaces that are at least partially included within the area of interest. The requestor may then be subscribed to each sub-space that is at least partially included within the area of interest. When subscribed to a sub-space, object registration information indicating one or more objects that are registered to the sub-space may be received from one or more sub-space components that are associated with the sub-space.

20 Claims, 8 Drawing Sheets

AREA OF INTEREST SUBSCRIPTION

BACKGROUND

Electronically presented content items, such as video games and other media items, may often present a virtual space, which may also sometimes be referred to as a virtual world, in which various actions may be performed. In some examples, a content item may improve the user experience by making its virtual space appear to be more realistic and/or life-like, such as by increasing the complexity and level of detail of the virtual space. For example, a virtual space may include large numbers of different and potentially diverse objects, such as humans, animals, vehicles, weapons, projectiles, trees, rocks, fish, birds, and many other objects. Many of these objects may at times be stationary and may, at other times, travel throughout various different locations within the virtual space. Additionally, such as to provide for greater diversity and to better accommodate large numbers of users, a virtual space may sometimes occupy a very large area including many different regions, such as cities, forests, mountains, valleys, deserts, rivers, oceans, and others. While the implementation of a detailed virtual space with many complex objects may generally enhance the user experience and make electronically presented content items more enjoyable, it may also, sometimes substantially, increase the time and quantity, sophistication and cost of resources required to generate, render, and update the virtual space.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
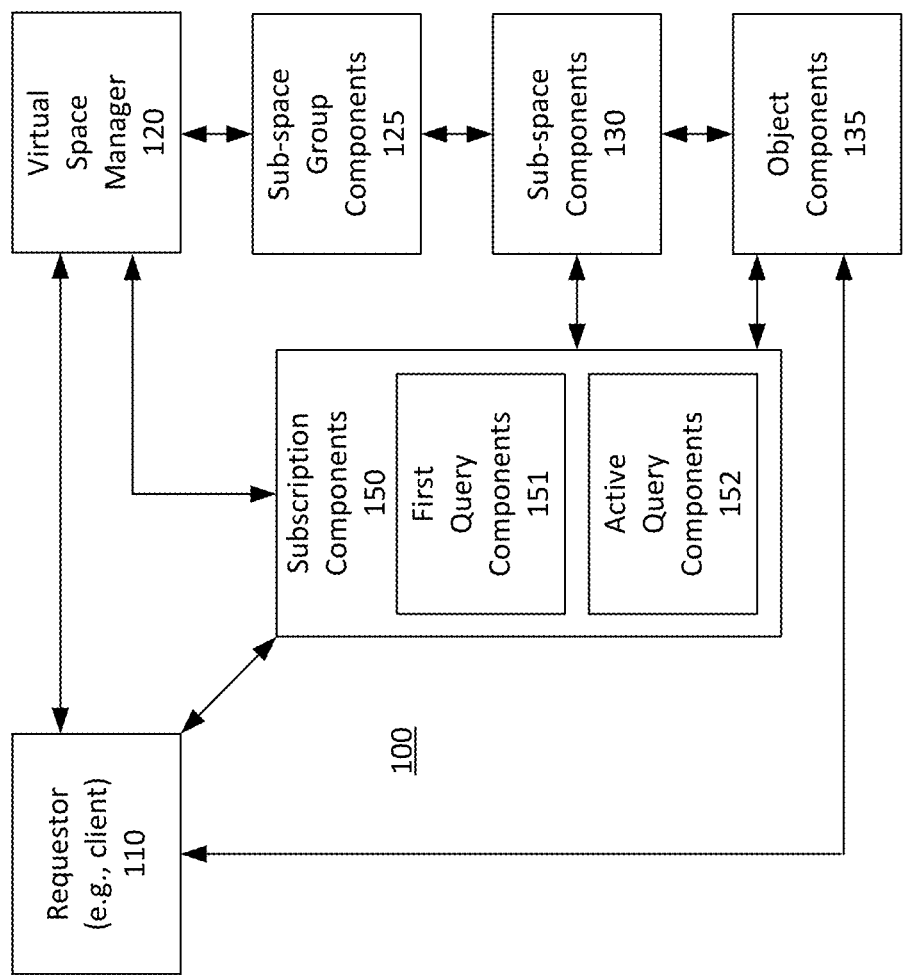
FIG. 1 is a diagram illustrating an example system for area of interest subscription that may be used in accordance with the present disclosure.

Techniques for area of interest subscription are described herein. In some examples, various aspects of area of interest subscription and other associated techniques may be employed using an actor-based framework. The actors may be, for example, computational units that may be capable of maintaining state. For example, actors may receive and respond to various messages and may also send messages to other actors. Actors may, for example, change state in response to receiving of messages. In some examples, actors may be capable of performing various operations concurrently or partially concurrently with other actors. As will be described in detail below, various entities associated with a virtual space, such as sub-spaces, objects, and other entities may have associated actors.

In some examples, a virtual space may be defined for use in an electronically presented content item, such as a video game or other media item. The virtual space may be divided into a number of sub-spaces, such as grid spaces or other portions of virtual space. Each sub-space may have one or more associated sub-space components, such as an associated actor, that may, for example, maintain state associated with the sub-space. Also, in some examples, one or more objects within the virtual space may have one or more associated object components, such as an associated actor, that may, for example, maintain state associated with the objects. In some examples, the sub-space components may receive object registration information indicating registration of objects to associated sub-spaces and de-registration of objects from associated sub-spaces. An object may be registered to a sub-space when, for example, the object is at least partially located in the sub-space. In some examples, object components may be responsible for providing object registration information for their associated objects to the appropriate sub-space components.

In some examples, a requestor, such as a client or other component, may be focused on a particular area of interest within the virtual space. The area of interest may include only a portion, and sometimes only a relatively small portion, of the entire virtual space. For example, in some cases, a client may be responsible for controlling a particular character within a video game. In these cases, the client's area of interest may sometimes correspond to a particular area that surrounds the character's location within the virtual space. In some examples, the area of interest may move throughout the virtual space and/or otherwise be adjusted, such as in shape, size, and/or location. For example, as a character moves throughout a virtual space, the area of interest may sometimes move to follow and continue to surround the character.

A requestor may, for example, provide information indicating its area of interest within the virtual space. This information may then be used to determine one or more sub-spaces that are at least partially included within the area of interest. The requestor may then be subscribed to each sub-space that is at least partially included within the area of interest. When subscribed to a sub-space, object registration information indicating one or more objects that are registered to the sub-space may be received from one or more sub-space components that are associated with the sub-space. In particular, the received information may include, for example, indications of objects that are registered to the sub-space at the initiation of the subscription as well as indications of objects that register to and/or de-register from the sub-space during the course of the subscription.

The object registration information received through the subscription may then be used to communicate with object components associated with registered objects. For example, the object components may be asked to provide object data associated with an object, such as its size, shape, color, opacity, texture, position, speed, direction of movement, rotation and other data corresponding to an associated object. This object data may then be used, for example, by the requestor to render and display the object. The requestor may also receive updates and changes to the object data at various desired intervals and/or in response to various events.

As set forth above, in some cases, an area of interest may sometimes be adjusted, such as by adjusting its size, shape and/or location, for example to follow a moving character or for other reasons. When an area of interest is adjusted, updated information associated with the changed area of interest may be provided and, if necessary, the requestor may be subscribed to one or more different sub-spaces and/or may be de-subscribed from one or more sub-spaces. The above described techniques for receiving object registration information for a subscribed sub-space and for receiving object data corresponding to subscribed objects may then performed for the adjusted are of interest.

As should be appreciated, in some examples, the disclosed techniques may strategically reduce the amount of objects from which a client or other requestor may receive object data. For example, in some cases, rather than receiving object data for objects positioned throughout an entire virtual space, the disclosed techniques may sometimes enable a client or other requestor to receive object data only for objects that are at least partially located within or otherwise associated with an area of interest. This may, for example, substantially reduce the amount of data that is transmitted from servers to clients, thereby potentially allowing more available communications bandwidth, reducing data communications and processing delays, reducing associated costs, and otherwise improving efficiency.

FIG. 1 is a diagram illustrating an example system 100 for area of interest subscription that may be used in accordance with the present disclosure. As shown in FIG. 1, system 100 includes a virtual space manager 120, which may be an actor and may be generally responsible for managing a virtual space defined for use in an electronically presented content item, such as a video game, a massively multi-player online (MMO) video game, or other media item. As set forth above, in some examples, the virtual space may be divided into a number of sub-spaces, such as grid spaces or other portions of virtual space. There is no requirement that sub-spaces must have any particular size or shape or that any sub-space must have an identical size or shape relative to any other sub-space. Each sub-space may have one or more associated sub-space components 130, such as an associated actor, that may, for example, maintain state associated with the sub-space.

In the example of FIG. 1, the virtual space is also divided into a number of sub-space groups. Each of the sub-space groups includes a number of assigned sub-spaces, such as an assigned group of neighboring or adjacent sub-spaces. Each sub-space group has one or more associated sub-space group components 125, such as an associated actor, that may perform operations associated with management of the sub-spaces assigned to the associated sub-space group. In some examples, components for each sub-space group and its associated sub-spaces may be located on one or more common servers or other compute nodes that may be separate and/or distinct from servers or other compute nodes that include components for other sub-space groups. This may sometimes allow for increased efficiency by potentially allowing components associated with neighboring and/or adjacent sub-spaces to be located on common servers or nodes, thereby, for example, improving scalability and potentially reducing communications latency and complexity.

As set forth above, the virtual space may include a number of objects, such as humans, animals, vehicles, weapons, projectiles, trees, rocks, fish, birds, and many other objects. These objects may be stationary and/or may move throughout the virtual space. Also, in some examples, one or more objects within the virtual space may have one or more associated object components 135, such as an associated actor, that may, for example, maintain state associated with the object. In some examples, object components 135 may register and de-register associated objects from a sub-space. An object may be registered to a sub-space when, for example, the object is at least partially located in the sub-space. In some examples, an object registration to a sub-space may be initiated when at least a portion of the object moves into or is otherwise inserted into a sub-space. Also, in some examples, an object may become de-registered from a sub-space when the object moves out of or is otherwise deleted from a sub-space. The object components 135 may provide, to the sub-space components 130, object registration information indicating objects that are registered to an associated sub-space. For example, when an object registers to a sub-space, an object component 135 associated with the object may notify a sub-space component 130 associated with the sub-space of the registration of the object with the sub-space. By contrast, when an object de-registers from a sub-space, an object component 135 associated with the object may notify a sub-space component 130 associated with the sub-space of the de-registration of the object from the sub-space. Additionally, the object registration information received by the sub-space components 130 may also include address information or other information for communicating with object components that are associated with registered objects.

As also shown in FIG. 1, system 100 includes requestor 110, such as a client or another component or system. Generally the requestor 110 may determine and provide information indicating an area of interest associated with the requestor 110 and may also request information associated with the area of interest. As set forth above, the area of interest may include only a portion, and sometimes only a relatively small portion, of the entire virtual space. As also set forth above, in some examples, the requestor 110 may sometimes control or otherwise be associated with a particular character within the content item. The requestor's area of interest may sometimes correspond to a particular area that surrounds the character's location within the virtual space, such as circular, rectangular or other shaped area with the character at or near its center. In some examples, the area of interest may move throughout the virtual space and/or otherwise be adjusted, such as in shape, size, and/or location. For example, as a character moves throughout a virtual space, the area of interest may sometimes move to follow and continue to surround the character.

In some cases, the requestor 110 and/or other components may provide information indicating an area of interest associated with the requestor 110. In some examples, the area of interest may be indicated using coordinate values, size information, shape information, center point information, offset or adjustment information (e.g., relative to a previously indicated area) or any combination of these or other types of information.

In some examples, the information indicating the area of interest may be provided to virtual space manager 120. The virtual space manager 120 may have information regarding the layout of sub-space groups and/or sub-spaces within the virtual space. The virtual space manager 120 may then use the layout information to determine which sub-spaces are at least partially included in the area of interest. For example, in some cases, coordinates associated with the area of interest may be compared with coordinates of various sub-spaces indicated within the layout information. The virtual space manager 120 may then inform subscription components 150 of the sub-spaces are at least partially included in the area of interest.

In some other examples, the virtual space manager 120 may provide to the subscription components 150 information regarding the layout of sub-space groups and/or sub-spaces within the virtual space. Additionally, information indicating the area of interest may also be provided to subscription components 150. The subscription components 150 may then use the layout information to determine which sub-spaces are at least partially included in the area of interest.

Thus, by way of these or other techniques, subscription components 150 may determine which sub-spaces of the virtual space are at least partially included in the area of interest. The subscription components 150 may then use this information to subscribe, on behalf of the requestor, to the sub-spaces of the virtual space are at least partially included in the area of interest. As set forth above, when subscribed to a sub-space, at least part of the object registration information for the sub-space may be received from one or more sub-space components 130 that are associated with the sub-space. As also set forth above, the object registration information received through the subscription may include, for example, indications of objects that are registered to the sub-space at the initiation of the subscription as well as indications of objects that register to and/or de-register from the sub-space during the course of the subscription.

In the example of FIG. 1, subscription components 150 include first query components 151 and active query components 152. Any or all of components 150, 151, and 152 may include one or more actors. First query components 151 may be employed to issue a first query to sub-space components 130 associated with sub-spaces to which the requestor is subscribed. The first query may request, for example, indications of objects that are registered to the sub-space at the initiation of the subscription. The first query may also request address information or other information for communicating with object components that are associated with registered objects.

Active query components 152 may be employed to issue an active query to sub-space components 130 associated with sub-spaces to which the requestor is subscribed. The active query may request, for example, indications of objects that register or de-register from the sub-space during the course of the subscription. The active query may also request address information or other information for communicating with object components that are associated with registered objects.

The object registration information received through the subscription, such as through the first query and the active query, may then be used to communicate with object components 135 associated with objects registered to subscribed sub-spaces. For example, as set forth above, the object components 135 may be asked to provide object data associated with an object, such as its size, shape, color, opacity, texture, position, speed, direction of movement, rotation and other data corresponding to an associated object. In some examples, subscription components 150 may contact the object components 135 and ask them to provide certain object data to the requestor 110. In some other examples, subscription components 150 may forward information for communicating with the objects to the requestor 110, which may then communicate with object components 135 to request the object data. The object data may then be used, for example, by the requestor to render and display the object, such as by using one or more graphics processing units (GPU's).

In some examples, a particular object may be simultaneously registered to multiple different subscribed sub-spaces. This may occur, for example, when an object is positioned such that it is split between (e.g., partially located within) two adjacent subscribed sub-spaces. In these examples, subscription components 150 may sometimes receive duplicate query results that repeatedly identify the object for each different subscribed sub-space to which the object is registered. These duplicate results may sometimes be problematic because they may potentially result in repeat requests for duplicate object data associated with the same object and may possibly even result in duplicate renderings of the same object. To help prevent these and other problems, subscription components 150 may, in some examples, examine received object registration information to identify duplicate indications of the same object being registered to different sub-spaces. One or more of the duplicate indications may then be ignored (e.g., not used for object data collection) in response to being identified, such as by removing one or more of the duplicate indications from the received object registration information prior to requesting object data from object components associated with the object.

In some examples, object registration information provided to sub-space components 130 and/or to subscription components 150 may include additional information such as an object type, size, shape, color, opacity, texture, position, speed, direction of movement, rotation and other object characteristics. Also, in some examples, the requestor may indicate, for example to subscription components 150, various filters associated with objects for which the requestor does or does not wish to receive information. For example, a requestor may indicate that the requestor would like to receive object data from airplanes within the area of interest but does not wish to receive object data from cars within the area of interest. As another example, a requestor may indicate that the requestor would like to receive object data from red objects within the area of interest but does not wish to receive object data from blue objects within the area of interest. In addition to object type and color, requestor filters may be generated over any object characteristic for which information is available, such as size, shape, color, opacity, texture, position, speed, direction of movement.

In addition to filters, the requestor may also indicate, for example to subscription components 150, a rate at which the requestor would like to receive object data updates. More frequent updates may allow the requestor to represent objects with greater fidelity, but may also require a greater amount of data to be received and processed by the requestor. By contrast, less frequent updates may reduce the amount of data to be received and processed by the requestor, but may also sometimes reduce the fidelity with which the requestor is able to represent objects. In some examples, a requestor may request different update rates for different objects. For example the requestor may sometimes request more frequent updates for objects of greater importance to the requestor, such as objects in the foreground of a camera view or objects with which an associated character is directly interacting.

In some cases, requestor 110 may adjust its area of interest, such as by adjusting its size, shape and/or location, for example to follow a moving character or for other reasons. In these cases, requestor 110 may provide, for example to virtual space manager 120 and/or subscription components 150, updated area of interest information that indicates a change in size, shape and/or location or that otherwise indicates the new area of interest. In some examples, when subscription component 150 has obtained layout information for the sub-spaces within the virtual space, the requestor may send updated area of interest information to subscription components 150. The subscription components 150 may then determine, for example based on their own comparison to layout information or based on information from virtual space manager 120, sub-spaces that are at least partially included within the new area of interest. The subscription components 150 may then de-subscribe from sub-spaces that were at least partially included in the prior area of interest but not at least partially included in the new area of interest. The subscription components 150 may also subscribe to sub-spaces that were not at least partially included in the prior area of interest but are at least partially included in the new area of interest.

Figure 2:
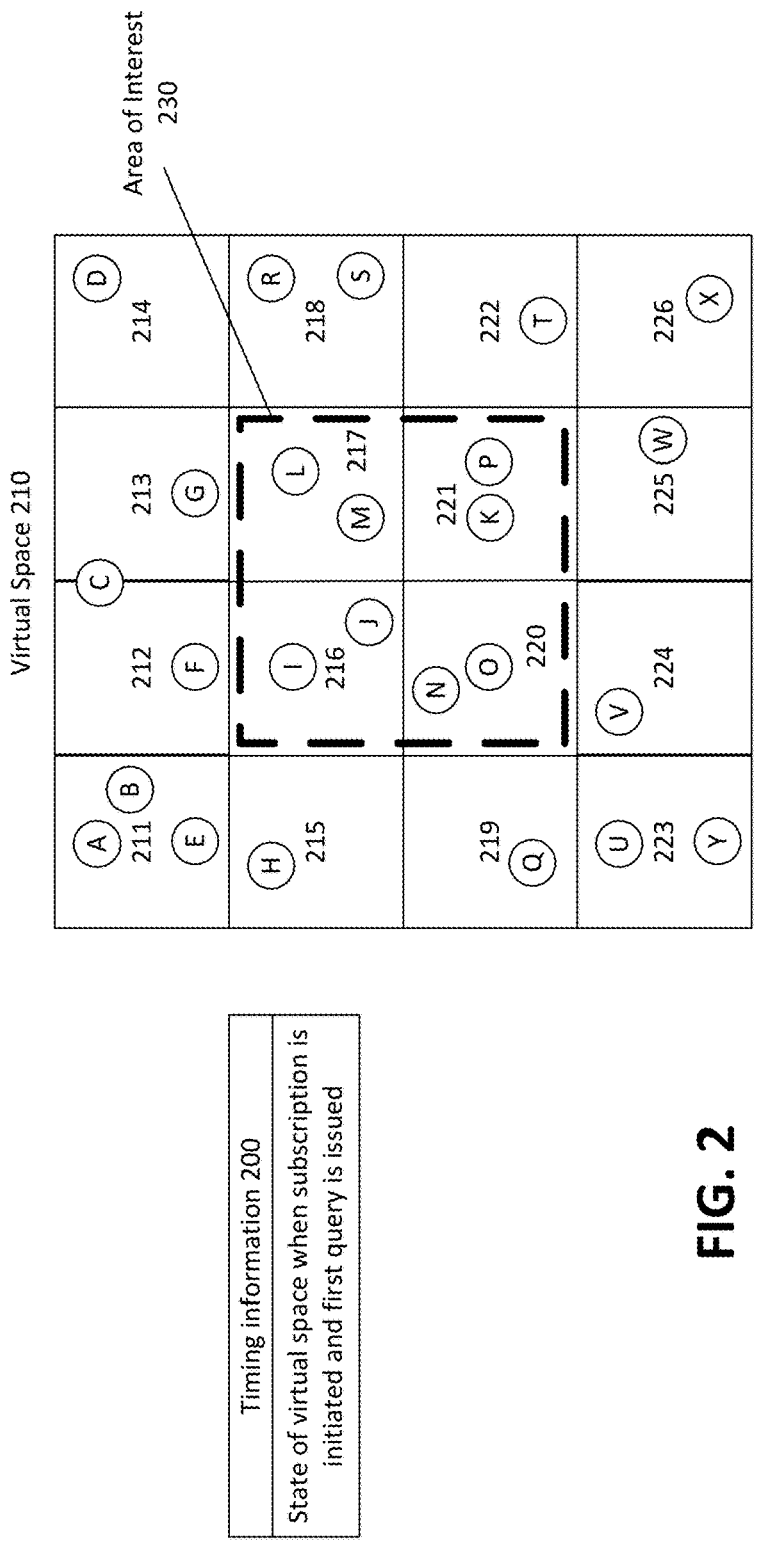
FIG. 2 is a diagram illustrating an example virtual space and area of interest that may be used in accordance with the present disclosure.

Some example virtual spaces and areas of interest will now be described in detail. In particular, FIG. 2 is a diagram illustrating an example virtual space 210 and area of interest 230 that may be used in accordance with the present disclosure. As shown in FIG. 2, virtual space 210 includes sixteen sub-spaces 211-226. Although sub-spaces 211-226 are squares in this example, it is once again noted that there is no requirement that sub-spaces must have any particular size or shape or that any sub-space must have an identical size or shape relative to any other sub-space. As shown, sub-spaces 211-226 include objects A-Y, such as humans, animals, vehicles, weapons, projectiles, trees, rocks, fish, birds, and many other objects. These objects may be stationary and/or may move throughout the virtual space.

As also shown in FIG. 2, virtual space 210 includes an example area of interest 230, which includes portions of sub-spaces 216, 217, 220 and 221. Accordingly, in the example of FIG. 2, a requestor may provide information indicating the location of area of interest 230, and this information may be compared against virtual space layout information indicating the locations of sub-spaces 211-226. This comparison of area of interest information to virtual space layout information may be used to determine that area of interest 230 includes at least part of sub-spaces 216, 217, 220 and 221.

Accordingly, in this example, the requestor may be subscribed to sub-spaces 216, 217, 220 and 221. As shown in timing information box 200, FIG. 2 portrays the state of the virtual space 210 when the subscription is initiated and the first query is issued. Accordingly, in this example, the subscription components may issue a first query to sub-space components associated with sub-spaces 216, 217, 220 and 221 to receive indications of objects registered to sub-spaces 216, 217, 220 and 221 at the initiation of the subscription.

As shown, sub-spaces 216, 217, 220 and 221 collectively include objects I-P, while objects A-H and Q-Y are not included within sub-spaces 216, 217, 220 and 221. Accordingly, when receiving the first query for registered objects, the sub-space components associated with sub-spaces 216, 217, 220 and 221 will indicate that objects I-P are registered to their associated sub-spaces. This information may then be used to communicate with object components associated with objects I-P and to request object data associated with objects I-P, such as size, shape, color, opacity, texture, position, speed, direction of movement, rotation and other data corresponding to objects I-P.

By contrast, in the example of FIG. 2, objects A-H and Q-Y are not located within area of interest 230 and are not identified as objects that are registered to a subscribed sub-space. Accordingly, in some examples, the requestor may not communicate and request object data for objects A-H and Q-Y, as these objects may be of lesser, if any, importance to the requestor. As set forth above, reducing or eliminating exchange of data regarding objects of lesser importance may, for example, reduce the amount of data that is transmitted from servers to clients and other requestors, thereby potentially allowing more available communications bandwidth, reducing data communications and processing delays, reducing associated costs, and otherwise improving efficiency.

Figure 3:
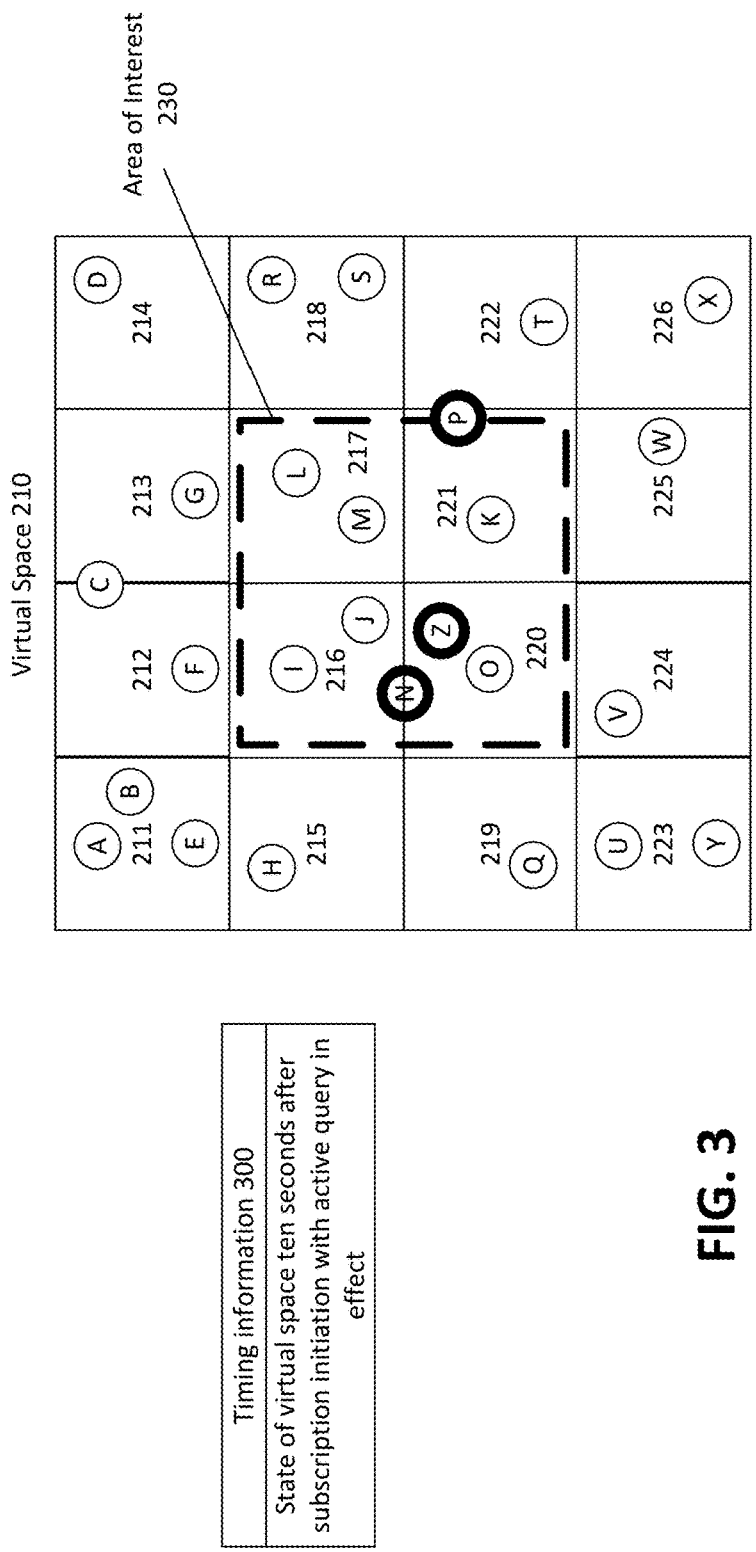
FIG. 3 is a diagram illustrating an example area of interest with moving and added objects that may be used in accordance with the present disclosure.

FIG. 3 is a diagram illustrating an example area of interest with moving and added objects that may be used in accordance with the present disclosure. It is noted that objects N, P, and Z are shown in bold highlighting in FIG. 3. This bold highlighting is used merely for the purpose of making these objects easily identifiable to the reader. As shown in timing information box 300, FIG. 3 portrays the state of the virtual space 210 ten seconds after subscription initiation with an active query in effect. As shown in FIG. 3, object Z has been added to sub-space 220. Referring back to FIG. 2, it can be seen that object Z was not included within the virtual space 210 when the subscription was initiated. Thus, object Z is an object that is added to virtual space 210 during the course of the subscription. Accordingly, based on the example of FIG. 3, the active query will trigger a sub-space component associated with sub-space 220 to indicate that object Z has been newly registered with sub-space 220 during the course of the subscription. This information may then be used to communicate with object components associated with object Z and to request object data associated with object Z.

As also shown in FIG. 3, object N has moved upward from its prior position in FIG. 2 such that object N is now partially located in both sub-space 220 and sub-space 216. Accordingly, multiple sub-space components associated with both sub-spaces 216 and 220 may provide duplicative indications of object N being registered to their respective associated sub-spaces. As set forth above, the subscription components may identify these duplicate indications of object N and remove the duplicate indication such as to prevent, for example, duplicate object data being requested and received for object N and possible duplicate renderings of object N.

As also shown in FIG. 3, object P has moved from its prior position in FIG. 2 such that object P is now partially located in both sub-space 221 and sub-space 222. As should be appreciated, because object P remains at least partially included in sub-space 221, object P may remain registered to sub-space 221. As should also be appreciated, because object P has at least partially entered sub-space 222, object P may register to sub-space 222. However, because sub-space 222 is not a subscribed sub-space, object P's registration to sub-space 222 will not be indicated as part of the subscription and, therefore, duplicate registration information for object P will not be received.

Figure 4:
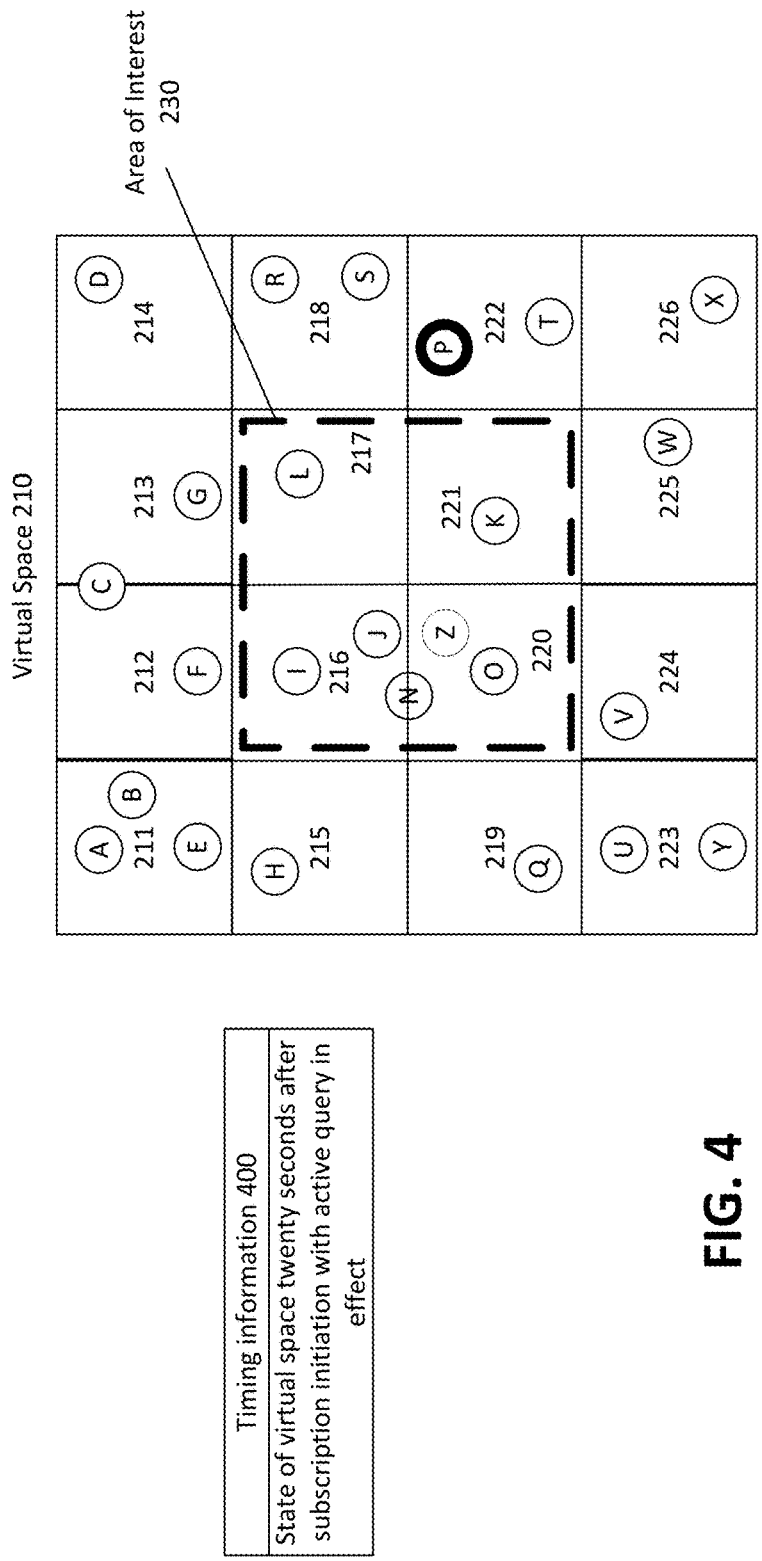
FIG. 4 is a diagram illustrating an example area of interest with moving and deleted objects that may be used in accordance with the present disclosure.

FIG. 4 is a diagram illustrating an example area of interest with moving and deleted objects that may be used in accordance with the present disclosure. It is noted that object P is shown in bold highlighting in FIG. 4. This bold highlighting is used merely for the purpose of making object P easily identifiable to the reader. As shown in timing information box 400, FIG. 4 portrays the state of the virtual space 210 twenty seconds after subscription initiation with an active query in effect. As shown in FIG. 4, object M is no longer included in virtual space 210. Referring back to FIG. 3, it can be seen that object M was formerly included within sub-space 217. Thus, object M is an object that is deleted from virtual space 210 during the course of the subscription. Accordingly, based on the example of FIG. 4, the active query will trigger a sub-space component associated with sub-space 217 to indicate that object M has been de-registered from sub-space 217 during the course of the subscription. This information may then cause communications with object components associated with object M to be ceased such that object data associated with object M is no longer received by the requestor.

As also shown in FIG. 4, object P has moved from its prior position in FIG. 3 such that object P is now entirely located in sub-space 222 and no longer partially located in sub-space 221. Accordingly, based on the example of FIG. 4, the active query will trigger a sub-space component associated with sub-space 221 to indicate that object P has been de-registered from sub-space 221 during the course of the subscription. This information may then cause communications with object components associated with object P to be ceased such that object data associated with object P is no longer received by the requestor.

Figure 5:
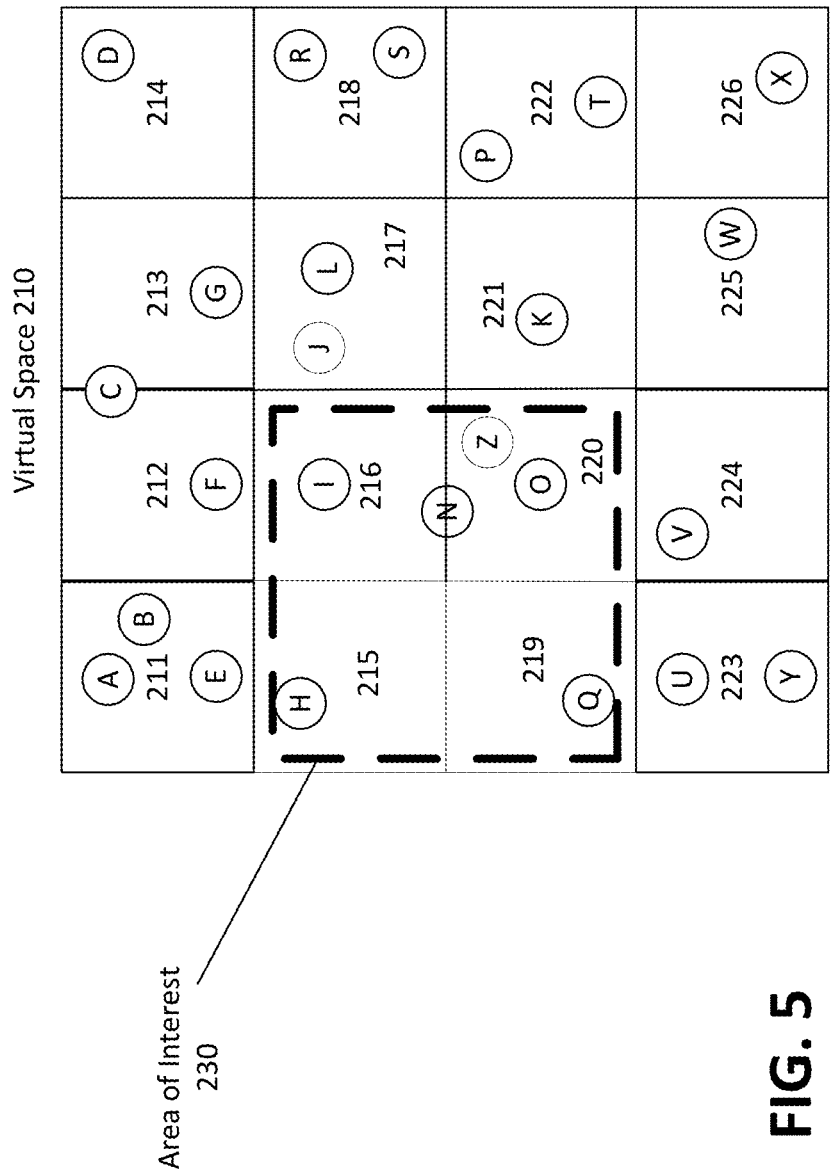
FIG. 5 is a diagram illustrating an example virtual space with an adjusted area of interest that may be used in accordance with the present disclosure.

FIG. 5 is a diagram illustrating an example virtual space with an adjusted area of interest that may be used in accordance with the present disclosure. As shown in FIG. 5, area of interest 230 has been adjusted such that it is no longer partially included in sub-spaces 217 and 221 and is now partially included in sub-spaces 215 and 219. As should be appreciated, area of interest 230 remains partially included in sub-spaces 216 and 220. As described above, the removal of area of interest 230 from sub-spaces 217 and 221 may cause the requestor to be de-subscribed from sub-spaces 217 and 221. Upon de-subscribing from sub-spaces 217 and 221, the subscription components may determine the objects registered to sub-spaces 217 and 221 (i.e., objects J, L, and K in FIG. 5) and may trigger object data associated with those objects to ease to be provided to the requestor.

Additionally, the requestor's newly initiated subscriptions to sub-spaces 215 and 219 may cause the subscription components to issue a first query to sub-space components associated with sub-spaces 215 and 219 to receive indications of objects registered to sub-spaces 215 and 219 (i.e., objects H and Q in FIG. 5). This information may then be used to communicate with object components associated with objects H and Q, and to request object data associated with objects H and Q.

Figure 6:
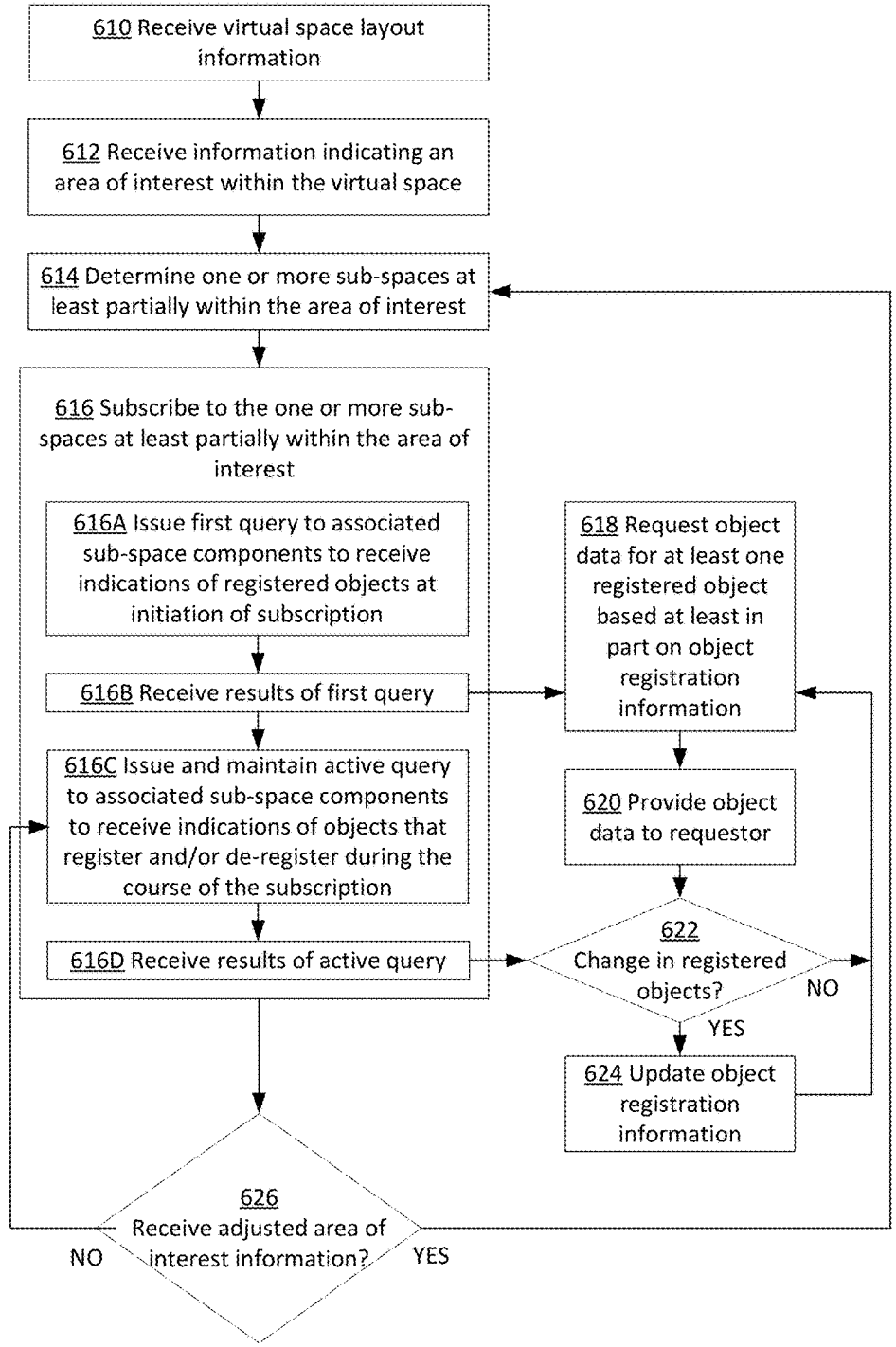
FIG. 6 is a flowchart illustrating an example process for providing information associated with an area of interest within a virtual space that may be used in accordance with the present disclosure.

FIG. 6 is a flowchart illustrating an example process for providing information associated with an area of interest within a virtual space that may be used in accordance with the present disclosure. As shown, at operation 610, layout information associated with the virtual space is received. As set forth above, the layout information may include, for example, information indicating various sub-space groups within the virtual space and various sub-spaces with each sub-space group. The layout information may also include, for example, information indicating positions, locations, shapes, sizes and other information associated with sub-spaces and/or sub-space groups. In some examples, the layout information may include coordinate values or other location information for sub-spaces and/or sub-space groups. As also set forth above, the layout information may, for example, be maintained by virtual space manager 120 of FIG. 1 and may sometimes be provided to other components, such as subscription components 150 of FIG. 1.

At operation 612, information is received indicating an area of interest within the virtual space. As set forth above, the information received at operation 612 may, for example, be provided by requestor 110 of FIG. 1 and may be received by, for example, virtual space manager 120 of FIG. 1 and/or subscription components 150 of FIG. 1. In some examples, the area of interest may be indicated using, for example, coordinate values, size information, shape information, center point information, offset or adjustment information (e.g., relative to a previously indicated area) or any combination of these or other types of information for the area of interest. As also set forth above, the area of interest may include only a portion, and sometimes only a relatively small portion, of the entire virtual space. The area of interest may sometimes correspond to a particular area that surrounds a character controlled by or otherwise associated with a requestor.

At operation 614, one or more sub-spaces that are at least partially within the area of interest are determined. In some examples, the sub-spaces that are at least partially within the area of interest may include less than all, and sometimes only a small portion, of the sub-spaces included within the entire virtual space. The determination made at operation 614 may, for example, be made based, at least in part, on the layout information received at operation 610 and the information indicating the area of interest received at operation 612. For example, in some cases, coordinates or other information associated with the area of interest may be compared with coordinates or other information associated with various sub-spaces indicated within the layout information. As set forth above, in some examples, operation 614 may be performed by subscription components 150 and/or virtual space manager 120. In some examples, virtual space manager 120 may compare the area of interest information and layout information and forward results of the comparison to subscription components 150. In some other examples, subscription components 150 may itself compare the area of interest information and layout information.

At operation 616, the one or more sub-spaces at least partially within the area of interest are subscribed to, for example on behalf of requestor 110. In some examples, the subscribing may include, for each of the sub-spaces at least partially within the area of interest, receiving, from one or more associated sub-space components, information indicating one or more objects that are registered to the sub-space. In particular, the received information may include, for example, indications of objects that are registered to the sub-space at the initiation of the subscription as well as indications of objects that register to and/or de-register from the sub-space during the course of the subscription.

In some examples, operation 616 may include sub-operations 616A-D, which may be performed for each of the sub-spaces that are at least partially within the area of interest. In particular, at operation 616A, a first query is issued to one or more associated sub-space components to receive indications of objects registered to the sub-space at the initiation of subscription. Operation 616A may be performed by, for example, first query components 151 of FIG. 1. At operation 616B, results of the first query are received, for example from the associated sub-space components.

At operation 616C, an active query is issued and maintained to one or more associated sub-space components to receive indications of objects that register to and/or de-register from the sub-space during the course of the subscription. Operation 616C may be performed by, for example, active query components 152 of FIG. 1. At operation 616D, results of the active query are received, for example from the associated sub-space components. In some examples, operation 616D may be performed repeatedly when objects register and/or de-register from a subscribed sub-space and an indication of the registering and/or de-registering is received.

At operation 618, object data is requested for at least one object that is registered to at least one subscribed sub-space. The object data may be requested based at least in part on object registration information, such as object information obtained from the results of the first query and/or the active query. The object data may be requested by, for example, subscription components 150 and/or requestor 110. In some examples, object data may be requested from each object that is registered to each of the subscribed sub-spaces. In some other examples, object data may only be requested from one or more objects that meet certain filter criteria, such as may be provided by the requestor. For example, the filter criteria may indicate an object type, size, shape, color, opacity, texture, position, speed, direction of movement, and other characteristics about objects for which object data is to be requested and provided. In some examples, object data may be requested and/or provided from each object that is registered to at least one subscribed sub-space and that has at least one of the one or more object characteristics indicated in the filter criteria. The object data for an object may, for example, be requested from one or more object components associated with the object.

At operation 620, the object data requested at operation 618 is provided, for example to the requestor 110. For example, object data for at least one object that is registered to at least one subscribed sub-space may be provided to the requestor 110. In some examples, the provided object data may be used for rendering and displaying of at least part of the area of interest. For example, the object data may indicate properties of objects within the area of interest that may be used to render and display the objects.

At operation 622, it is determined whether there is a change in objects that are registered to a subscribed sub-space. This determination may be made, for example, based on the results of the active query which may be received, in some cases repeatedly, at operation 616D. For example, operation 622 may include determining whether an object has registered to and/or de-registered from a subscribed sub-space. If, at operation 622, it is determined that there is a change in objects that are registered to a subscribed sub-space, then, at operation 624, object registration information may be updated to reflect the change in objects that are registered to a subscribed sub-space.

As shown in FIG. 6, operations 618-624 may be periodically repeated to request and provide updated object data. In some examples, an indication may be provided, such as by the requestor 110, of when updated object data is to be requested and/or provided. For example, the requestor 110 may indicate a time interval for requesting and/or providing updated object data, various events (e.g., registering and/or de-registering of objects) that may trigger requesting and/or providing of updated object data, and other information for requesting and/or providing updated object data. In some examples, updated object data may also be used for rendering and displaying of at least part of the area of interest.

At operation 626, it is determined whether adjusted area of interest information is received. As set forth above, in some cases, requestor 110 may adjust its area of interest, such as by adjusting its size, shape and/or location, for example to follow a moving character or for other reasons. In these cases, requestor 110 may provide, for example to virtual space manager 120 and/or subscription components 150, updated area of interest information that indicates a change in size, shape and/or location or that otherwise indicates the new area of interest.

As shown in FIG. 6, when no adjusted area of interest information is received at operation 626, the example process may continue to loop back to operation 616C at which the active query is maintained. On the other hand, when adjusted area of interest information is received at operation 626, the example process loops back to operation 614, at which one or more sub-spaces that are at least partially within the adjusted area of interest are determined. Based upon the determination at operation 614, the subscription components 150 may then de-subscribe from sub-spaces that were at least partially included in the prior area of interest but not at least partially included in the adjusted area of interest. The subscription components 150 may also subscribe to sub-spaces that were not at least partially included in the prior area of interest but are at least partially included in the adjusted area of interest.

Figure 7:
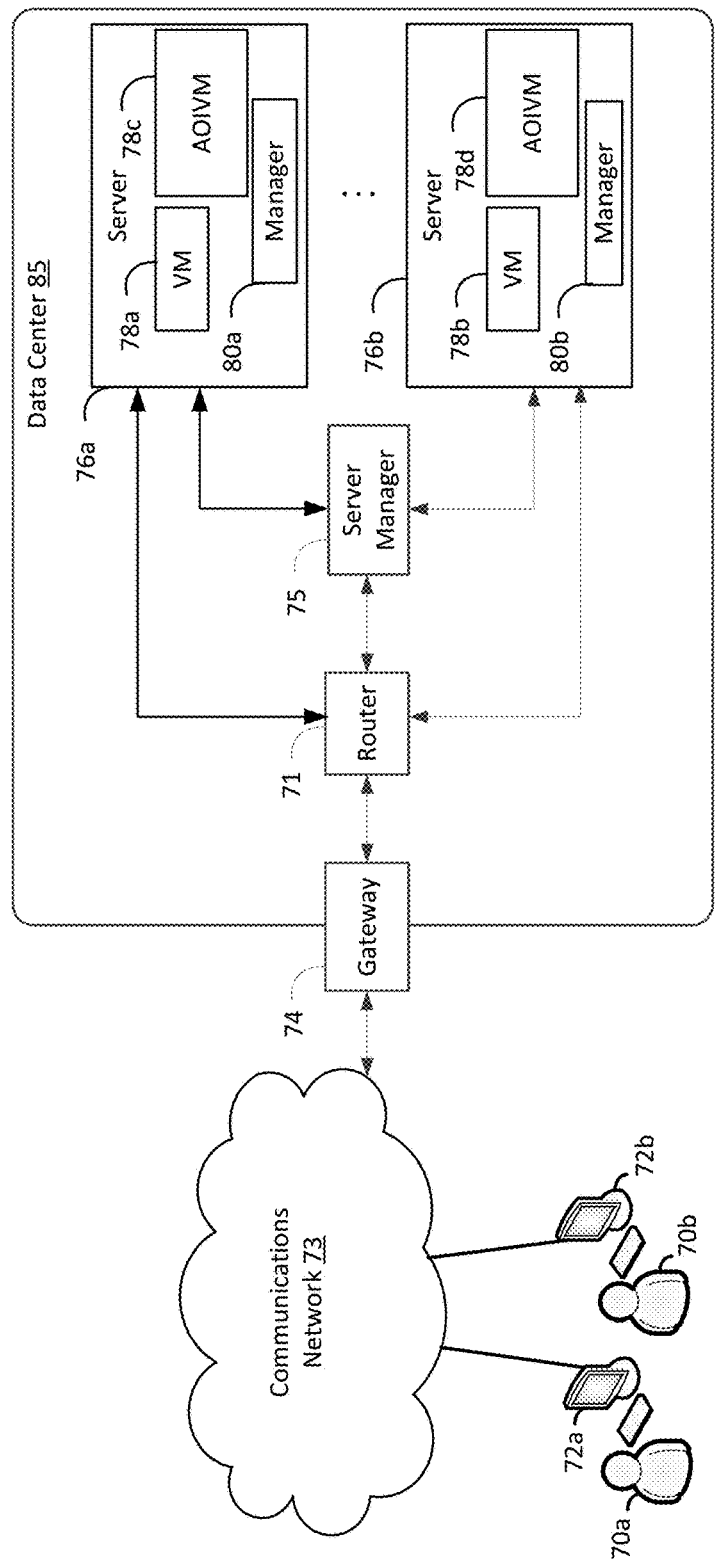
FIG. 7 is a diagram illustrating an example system for providing electronically presented content that may be used in accordance with the present disclosure.

An example system for providing electronically presented content, such as a video game or other media items, will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are area of interest virtual machine ("AOIVM") instances. The AOIVM virtual machine instances 78c and 78d may be configured to perform all, or any portion, of the techniques for area of interest subscription and/or any other of the disclosed techniques in accordance with the present disclosure and described in detail above. As should be appreciated, while the particular example illustrated in FIG. 7 includes one AOIVM virtual machine in each server, this is merely an example. A server may include more than one AOIVM virtual machine or may not include any AOIVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be standard servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications.

Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 8:
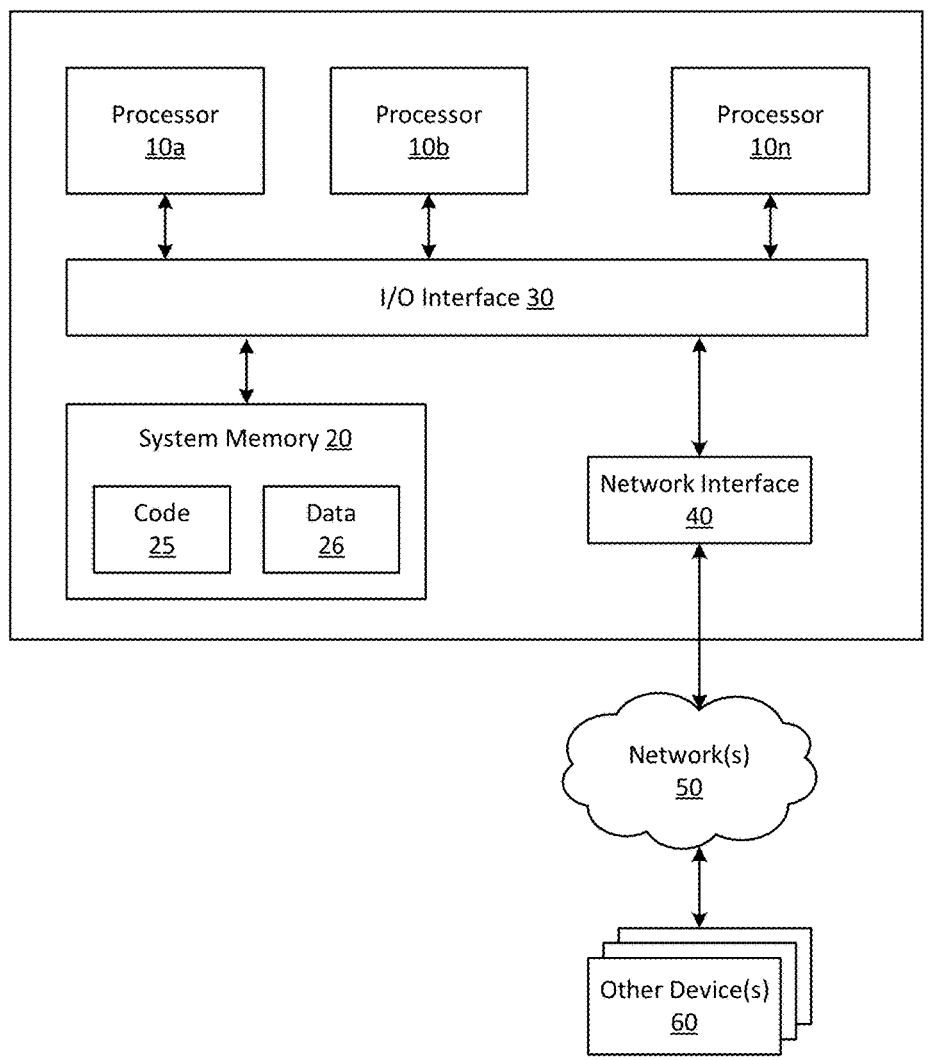
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems. The term "computing device," as used herein, refers to at least all these types of devices and is not limited to these types of devices.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for providing information associated with an area of interest within a virtual space comprising:
one or more processors;
one or more memories having stored therein computer instructions that, upon execution by the one or more processors, cause at least the computing system to perform operations comprising:
receiving information indicating the area of interest within the virtual space, wherein the virtual space comprises a plurality of sub-spaces associated with a plurality of sub-space components, the plurality of sub-space components receiving information indicating registration of objects to associated sub-spaces and de-registration of objects from associated sub-spaces;
determining one or more sub-spaces of the virtual space that are at least partially included within the area of interest, wherein the one or more sub-spaces comprise less than all of the plurality of sub-spaces;
for each of the one or more sub-spaces, subscribing to the sub-space to receive, from one or more associated sub-space components, information indicating one or more objects that are registered to the sub-space, wherein a first object registers to or de-registers from a first sub-space of the one or more sub-spaces during a course of a subscription to the first sub-space; and providing, for rendering and display of at least part of the area of interest, object data associated with at least one object that is registered to at least one of the one or more sub-spaces.

2. The computing system of claim 1, wherein the information indicating one or more objects that are registered to the sub-space comprises information indicating one or more objects that are registered to the sub-space at an initiation of a subscription, one or more objects that register to the sub-space during a course of the subscription, and one or more objects that de-register from the sub-space during the course of the subscription.

3. The computing system of claim 1, wherein the operations further comprise:

receiving an indication of an adjustment to the area of interest within the virtual space; and performing, based at least in part on the adjustment, at least one of de-subscribing from at least one of the one or more sub-spaces or subscribing to at least one additional sub-space.

4. The computing system of claim 1, wherein one or more objects within the virtual space each have one or more associated object components, and wherein the object components notify the sub-space components regarding associated objects registering to and deregistering from associated sub-spaces.

5. A method for providing information associated with an area of interest within a virtual space comprising:

receiving information indicating the area of interest within the virtual space, wherein the virtual space comprises a plurality of sub-spaces associated with a plurality of sub-space components, the plurality of sub-space components receiving information indicating registration of objects to associated sub-spaces and de-registration of objects from associated sub-spaces;

determining one or more sub-spaces of the virtual space that are at least partially included within the area of interest, wherein the one or more sub-spaces comprise less than all of the plurality of sub-spaces;

for each of the one or more sub-spaces, subscribing to the sub-space to receive, from one or more associated sub-space components, information indicating one or more objects that are registered to the sub-space, wherein a first object registers to or de-registers from a first sub-space of the one or more sub-spaces during a course of a subscription to the first sub-space; and providing object data associated with at least one object that is registered to at least one of the one or more sub-spaces.

6. The method of claim 5, wherein the information indicating one or more objects that are registered to the sub-space comprises information indicating one or more objects that are registered to the sub-space at an initiation of a subscription, one or more objects that register to the sub-space during a course of the subscription, and one or more objects that de-register from the sub-space during the course of the subscription.

7. The method of claim 5, further comprising:

receiving an indication of an adjustment to the area of interest within the virtual space; and performing, based at least in part on the adjustment, at least one of de-subscribing from at least one of the one or more sub-spaces or subscribing to at least one additional sub-space.

8. The method of claim 5, wherein one or more objects within the virtual space each have one or more associated object components, and wherein the object components notify the sub-space components regarding associated objects registering to and deregistering from associated sub-spaces.

9. The method of claim 8, wherein at least one of the object components or the sub-space components include actors that maintain state.

10. The method of claim 5, wherein the objects are registered to sub-spaces when the objects are at least partially included within the sub-spaces.

11. The method of claim 5, further comprising:

receiving one or more filters indicating one or more object characteristics; and providing object data associated with each object that is registered to at least one of the one or more sub-spaces and that has at least one of the one or more object characteristics.

12. The method of claim 5, further comprising:

identifying duplicate indications of a single object that is registered to multiple sub-spaces; and determining to ignore one or more of the duplicate indications in response to the identifying.

13. One or more non-transitory computer-readable storage media having stored thereon instructions that, upon execution by one or more compute nodes, cause the one or more compute nodes to perform operations comprising:

receiving information indicating an area of interest within a virtual space, wherein the virtual space comprises a plurality of sub-spaces associated with a plurality of sub-space components, the plurality of sub-space components receiving information indicating registration of objects to associated sub-spaces and de-registration of objects from associated sub-spaces;

determining one or more sub-spaces of the virtual space that are at least partially included within the area of interest, wherein the one or more sub-spaces comprise less than all of the plurality of sub-spaces;

for each of the one or more sub-spaces, subscribing to the sub-space to receive, from one or more associated sub-space components, information indicating one or more objects that are registered to the sub-space, wherein a first object registers to or de-registers from a first sub-space of the one or more sub-spaces during a course of a subscription to the first sub-space; and providing object data associated with at least one object that is registered to at least one of the one or more sub-spaces.

14. The one or more non-transitory computer-readable storage media of claim 13, wherein the information indicating one or more objects that are registered to the sub-space comprises information indicating one or more objects that are registered to the sub-space at an initiation of a subscription, one or more objects that register to the sub-space during a course of the subscription, and one or more objects that de-register from the sub-space during the course of the subscription.

15. The one or more non-transitory computer-readable storage media of claim 13, wherein the operations further comprise:

receiving an indication of an adjustment to the area of interest within the virtual space; and performing, based at least in part on the adjustment, at least one of de-subscribing from at least one of the one or more sub-spaces or subscribing to at least one additional sub-space.

16. The one or more non-transitory computer-readable storage media of claim 13, wherein one or more objects within the virtual space each have one or more associated object components, and wherein the object components notify the sub-space components regarding associated objects registering to and deregistering from associated sub-spaces.

17. The one or more non-transitory computer-readable storage media of claim 16, wherein at least one of the object components or the sub-space components include actors that maintain state.

18. The one or more non-transitory computer-readable storage media of claim 13, wherein the objects are registered to sub-spaces when the objects are at least partially included within the sub-spaces.

19. The one or more non-transitory computer-readable storage media of claim 13, wherein the operations further comprise:
    receiving one or more filters indicating one or more object characteristics; and
    providing object data associated with each object that is registered to at least one of the one or more sub-spaces and that has at least one of the one or more object characteristics.

20. The one or more non-transitory computer-readable storage media of claim 13, wherein the operations further comprise:
    identifying duplicate indications of a single object that is registered to multiple sub-spaces; and
    determining to ignore one or more of the duplicate indications in response to the identifying.

* * * * *